United States Patent
Kumar et al.

(10) Patent No.: US 8,684,150 B2
(45) Date of Patent: Apr. 1, 2014

(54) CONTROL ASSEMBLY AND CONTROL METHOD FOR SUPPLYING POWER TO ELECTRIFIED RAIL VEHICLES

(75) Inventors: Ajith Kuttannair Kumar, Erie, PA (US); Bret Worden, Erie, PA (US)

(73) Assignee: General Electric Company, Schenectady, NY (US)

( * ) Notice: Subject to any disclaimer, the term of this patent is extended or adjusted under 35 U.S.C. 154(b) by 654 days.

(21) Appl. No.: 12/815,996

(22) Filed: Jun. 15, 2010

(65) Prior Publication Data
US 2011/0307113 A1    Dec. 15, 2011

(51) Int. Cl.
*B60M 3/00* (2006.01)
*B60M 3/04* (2006.01)
*B60M 3/06* (2006.01)

(52) U.S. Cl.
USPC ............ 191/2; 191/6; 191/14; 104/289

(58) Field of Classification Search
USPC ............ 191/2–8, 14, 15; 104/289; 246/87; 307/9.1, 10.1; 700/291, 295; 701/19, 701/20
See application file for complete search history.

(56) References Cited

U.S. PATENT DOCUMENTS

| | | | |
|---|---|---|---|
| 4,523,059 A | | 6/1985 | Kawamura |
| 5,280,418 A | * | 1/1994 | Griffin ........................ 363/34 |
| 5,297,484 A | * | 3/1994 | Piserchia et al. ............. 105/1.5 |
| 6,591,758 B2 | * | 7/2003 | Kumar ........................... 105/35 |
| 6,864,598 B2 | * | 3/2005 | Nogaret et al. .............. 307/10.1 |
| 7,669,534 B2 | * | 3/2010 | Kumar et al. ................... 105/35 |
| 7,791,292 B2 | * | 9/2010 | Glasl et al. .................... 318/139 |
| 2009/0032350 A1 | | 2/2009 | Shapery |
| 2009/0138149 A1 | | 5/2009 | Chattot |

FOREIGN PATENT DOCUMENTS

| | | |
|---|---|---|
| DE | 3235107 A1 | 4/1983 |
| DE | 19654960 A1 | 7/1998 |
| DE | 102008027645 A1 | 12/2009 |
| EP | 0997340 A1 | 5/2000 |
| EP | 1892141 A1 | 2/2008 |
| JP | 60128804 A | 7/1985 |

OTHER PUBLICATIONS

Search Report and Written Opinion from corresponding PCT Application No. PCT/US2010/057833 dated Mar. 2, 2012.

* cited by examiner

*Primary Examiner* — Zachary Kuhfuss
(74) *Attorney, Agent, or Firm* — GE Global Patent Operation; John A. Kramer

(57) ABSTRACT

A control assembly includes a monitoring module and a switching module. The monitoring module determines a load demand of a first rail vehicle traveling along a track, wherein the first rail vehicle is supplied with electric current from a plurality of power sources over a conductive pathway extending along the track. The switching module is communicatively coupled with the monitoring module and is joined with a switch controller disposed between the power sources and the conductive pathway. The switching module directs the switch controller to change which of the power sources supply the electric current to the first rail vehicle over the conductive pathway based on the load demand.

25 Claims, 5 Drawing Sheets

CONTROL ASSEMBLY AND CONTROL METHOD FOR SUPPLYING POWER TO ELECTRIFIED RAIL VEHICLES

BACKGROUND OF THE INVENTION

The subject matter described herein relates generally to electrified rail systems.

Known electrified rail systems include rail vehicles that are powered by electric current. The rail vehicles may receive current from a utility, such as an electric utility or company that generates, transmits, and/or distributes electric current to a general population. The current is supplied along feeder lines or cables that deliver the current to substations located along a track on which the rail vehicles travel. The substations supply the current to overhead catenaries that transmit the current to the rail vehicles.

One problem with some known electrified rail systems is that the available supply of electric current may not adapt as the demand for the current changes. For example, the supply of current may not change in response to changes in the rail traffic throughout a day. As a result, the supply of current may be greater than the need of the rail vehicles or the supply may be unable to meet the need for electric current to power the rail vehicles.

Another problem with some known electrified rail systems is the inability to introduce additional sources of current for the rail vehicles. For example, some systems may be limited to supplying current from existing utilities rather than allowing other sources of current to supply current to the rail vehicles.

Additionally, some electrified rail vehicles create electric current that is fed back to the sources of current that power the vehicles. For example, some rail vehicles include regenerative braking systems that create electric current when the rail vehicles slow down. The magnitude of the regenerative current that is created by the vehicles may depend on number of vehicles, the kinetic energy of the vehicles, and the like. The utilities that receive the regenerative current may have limits on the regenerative current that can be received from the rail vehicles. For example, during periods of relatively low traffic density of rail vehicles, the utility that supplies power to the rail vehicles may be unable to accept most or all of the regenerative current. As a result, the rail vehicles can have limits on the maximum speeds at which the rail vehicles travel in order to avoid overloading the utilities with regenerative current.

The speed at which electrified rail vehicles operate may be based on control signals that are transmitted to the rail vehicles. The control signals are used to speed up or slow down the rail vehicles. Electronic hardware is required to transmit, receive, and interpret the control signals. This electronic hardware is in addition to the other hardware and components of the rail vehicles. As a result, the electronic hardware used to transmit, receive, and interpret the control signals adds to the cost of providing and/or maintaining the rail vehicles.

A need exists to provide assemblies, systems, and/or methods that control the supply of electric current to electrified rail vehicles and that address one or more of the shortcomings of some known electrified rail systems described above.

BRIEF DESCRIPTION OF THE INVENTION

In one embodiment, a control assembly is provided. The control assembly includes a monitoring module and a switching module. The monitoring module determines a load demand of a first rail vehicle traveling along a track, wherein the first rail vehicle is supplied with electric current from a plurality of power sources over a conductive pathway extending along the track. The switching module is communicatively coupled with the monitoring module and is joined with a switch controller disposed between the power sources and the conductive pathway. The switching module directs the switch controller to change which of the power sources supply the electric current to the first rail vehicle over the conductive pathway based on the load demand.

In another embodiment, a control method is provided. The method includes directing electric current from one or more of a plurality of power sources to a first rail vehicle along a conductive pathway that extends along a track on which the first rail vehicle travels; determining a load demand of the first rail vehicle; and changing which of the plurality of power sources supply the electric current to the first rail vehicle based on the load demand of the first rail vehicle.

In another embodiment, a computer readable storage medium for a control assembly of an electrified rail system is provided. The computer readable storage medium includes instructions to direct the control assembly to: direct at least one of a plurality of power sources to supply electric current to a first rail vehicle along a conductive pathway that extends along a track on which the first rail vehicle travels; determine a load demand of the first rail vehicle; and change which of the plurality of power sources supplies the electric current to the first rail vehicle based on the load demand of the first rail vehicle.

DETAILED DESCRIPTION OF THE INVENTION

Figure 1:
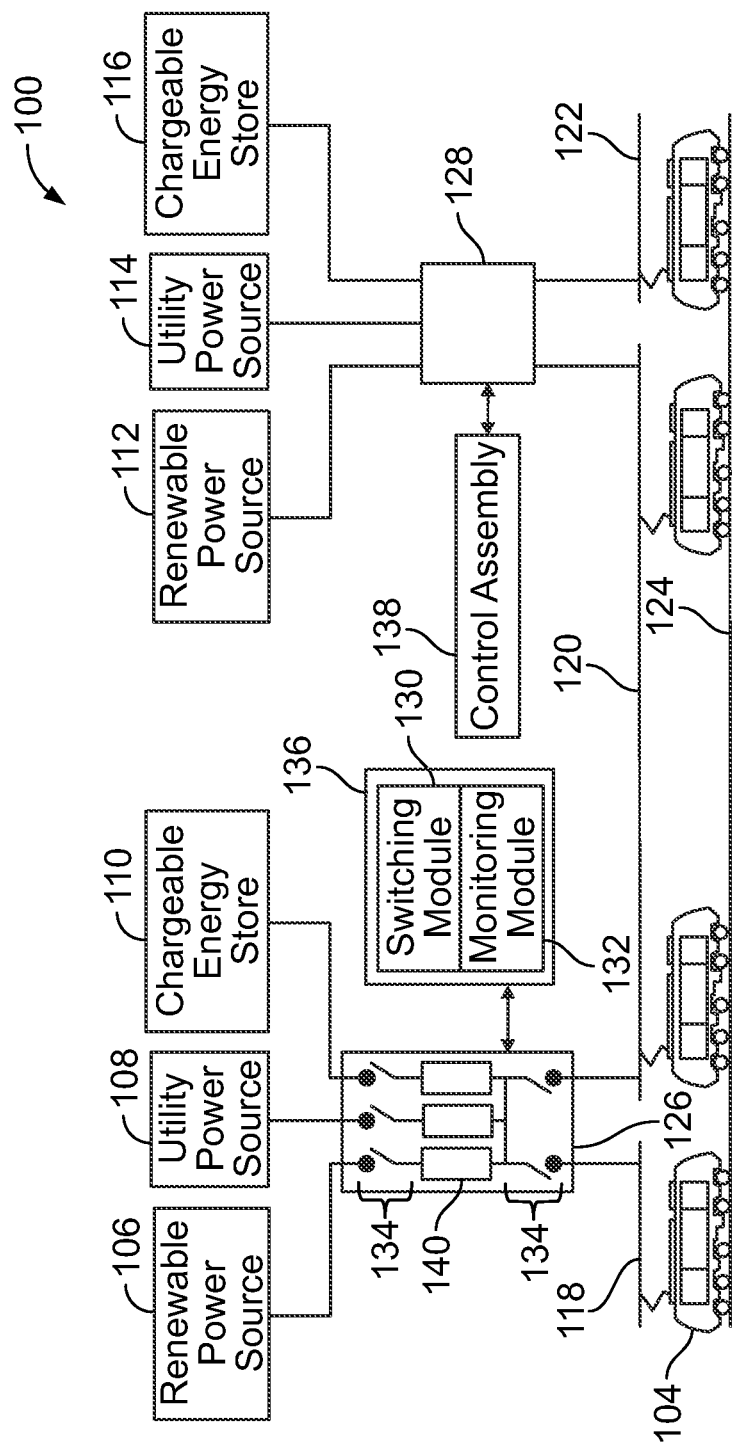
FIG. 1 is a diagram of an electrified rail system in accordance with one embodiment.

The foregoing brief description, as well as the following detailed description of certain embodiments of the present subject matter, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" or "including" an element or a plurality of elements having a particular property may include additional such elements not having that property.

It should be noted that although one or more embodiments may be described in connection with electrified rail vehicles having locomotives with trailing passenger cars, the embodiments described herein are not limited to passenger trains. In particular, one or more embodiments may be implemented in connection with different types of rail vehicles and other vehicles. For example, one or more embodiments may be used in conjunction with a vehicle that travels on one or more rails, such as single locomotives and railcars, powered ore carts and other mining vehicles, light rail transit vehicles, and the like. Example embodiments of systems and methods for controlling the supply of electric current to electrified rail vehicles via a conductive pathway that extends along a track, such as a catenary or third rail, are provided. As described below, one or more of these embodiments may control which of several power sources delivers electric current to the rail vehicles based on a load demand of the rail vehicles. For example, based on a level of traffic of rail vehicles, one or more embodiments may vary which of the power sources supply current to the rail vehicles. In another example, one or more embodiments use the conductive pathway as a transmission line to supply current to a chargeable energy store that is charged by the current for later use by the rail vehicles. In another embodiment, the conductive pathway transfers regenerated electric current that is created by the rail vehicles to a chargeable energy store for storing the current.

FIG. 1 is a diagram of an electrified rail system 100 in accordance with one embodiment. The system 100 includes several power sources 106, 108, 110, 112, 114, 116 that supply electric current to electrified rail vehicles 104. Control assemblies 136, 138 are communicatively coupled with switch controllers 126, 128 disposed between the power sources 106, 108, 110, 112, 114, 116 and conductive pathways 118, 120, 122. The rail vehicles 104 are electrified rail vehicles that receive electric current from the power sources 106, 108, 110, 112, 114, 116 by way of the conductive pathways 118, 120, 122. The conductive pathways 118, 120, 122 extend along a track 124 on which the rail vehicles 104 travel. The current is supplied from the power sources 106, 108, 110, 112, 114, 116 to the rail vehicles 104 by way of (over) the conductive pathways 118, 120, 122. For example, the conductive pathways 118, 120, 122 may be catenaries disposed above the rail vehicles 104 and along the track 124. In another example, the conductive pathways 118, 120, 122 may be electrified rails that extend along the track 124, e.g., so-called third rails.

In an embodiment, "track" refers to one rail or set of parallel rails over which rail vehicles travel serially. In another embodiment, "track" refers to multiple sets of rails within the same circuit over which rail vehicles may travel in parallel, such as plural parallel sets of rails located along a route for allowing a first rail vehicle to travel in one direction along the route and a second rail vehicle to simultaneously travel in an opposite direction along the route. In another embodiment, "track" refers to a track network. "Electrified" rail vehicle refers to a rail vehicle that receives electric power from an off-board source while traveling along a track, where the electric power is used for traction/movement purposes of the rail vehicle, e.g., for powering electric traction motors of the rail vehicle. This does not preclude the rail vehicle from also having an on-board power source, such as an on-board energy storage device or an engine. However, in an embodiment, the only source of electric power for an electrified rail vehicle is from off-board the vehicle. In another embodiment, an electrified rail vehicle has an on-board energy storage device but lacks means for on-board non-regenerative generation of electrical power. That is, it may be the case that the rail vehicle generates electrical power through regenerative braking, by converting momentum to available electrical energy, but lacks a fuel cell, engine/alternator, or the like for generating electricity from an on-board fuel source.

One or more of the power sources 106, 108, 110, 112, 114, 116, 118 may be high capacity power sources, meaning capable of providing, at least periodically, electrical power levels of 1 MW or more. Alternatively or additionally, one or more of the power sources 106, 108, 110, 112, 114, 116, 118 may be mid-capacity power sources, meaning capable of providing, at least periodically, electrical power levels of 5 kW or more. In one embodiment, a utility power source 108, 110 is a high capacity power source, and a renewable energy power source 106, 112 ("renewable power source") is a mid-capacity power source.

The control assemblies 136, 138 may be disposed in electric substations or other structures that are spaced apart along the track 124. The control assemblies 136, 138 are spaced relatively far apart in one embodiment. By way of example only, the substations or structures that house the control assemblies 136, 138 may be spaced apart by at least 15 miles (approximately 24 km) or more. The control assemblies 136, 138 may be one or more computers, computer processors, microcontrollers, other logic devices, and the like, including associated input/output components for control of external devices, that operate based on instructions stored on a tangible and non-transitory computer readable medium. Alternatively, the control assemblies 136, 138 may be manually controlled by an operator. For example, an operator may actuate one or more input devices, such as switches, knobs, dials, and the like, of the control assemblies 136, 138 based on the operator's judgment and the conditions or status of the power sources 106, 108, 110, 112, 114, 116 and/or the rail vehicles 104.

The control assemblies 136, 138 are communicatively coupled with switch controllers 126, 128 disposed between the power sources 106, 108, 110, 112, 114, 116 and the conductive pathways 118, 120, 122. The switch controllers 126, 128 each include several switches 134. The switches 134 represent mechanisms that permit or restrict the flow of current through a circuit. For example, a switch 134 may be any device that controllably alternately opens and closes a circuit to alternatively prevent and permit current to flow through the circuit. In one embodiment, the switch controllers 126, 128 include one or more electric conversion components 140 between the power sources 106, 108, 110, 112, 114, 116 and the conductive pathways 118, 120, 122. As shown in FIG. 1, the conversion components 140 may be disposed between switches 134 within the switch controllers 126, 128. Alternatively, the conversion components 140 may not be provided or may be located in a different position. The conversion components 140 convert current and/or voltage supplied from one or more of the power sources 106, 108, 110, 112, 114, 116 to one or more of the conductive pathways 118, 120, 122. The conversion components 140 may convert current and/or voltage supplied from one or more of the conductive pathways 118, 120, 122 to one or more of the power sources 106, 108, 110, 112, 114, 116. For example, the conversion components 140 may include inverters that convert direct current from a chargeable energy store 110, 116 into an alternating current that is supplied to the conductive pathways 118, 120, 122 to power the rail vehicles 104. In another example, the conversion components 140 may include inverters or rectifiers that convert alternating current on the conductive pathways 118, 120, 122 to a direct current that is supplied to the chargeable energy store 110, 116.

The conversion components 140 can include transformers that change the voltage supplied to the rail vehicles 104. For example, transformers of the conversion components 140 may step down a voltage supplied by a renewable energy power source 106, 112 and/or a utility power source 108, 114 to a voltage that is suitable for the rail vehicles 104. Alternatively, the transformers of the conversion components 140 may step up a voltage along the conductive pathways 118, 120, 122 to a voltage that is suitable for one or more of the power sources 106, 108, 110.

The control assemblies 136, 138 direct operation of the switch controllers 126, 128 through one or more wired and/or wireless connections. The switch controllers 126, 128 alternate each of the switches 134 between open and closed positions to alternatively prevent and allow current to flow from one or more power sources 106, 108, 110, 112, 114, 116 to the conductive pathways 118, 120, 122. Although not shown in FIG. 1, the switch controller 128 also includes plural switches 134.

By way of example only, each switch controller 126, 128 may include several bridges or circuits that each electrically joins a different power source 106, 108, 110, 112, 114, 116 with one or more of the conductive pathways 118, 120, 122. One bridge or circuit in the switch controller 126 may be opened to prevent current from flowing to the conductive pathway 120 from one power source 106 while another bridge or circuit in the switch controller 126 is closed. The closing of the other bridge or circuit allows current to flow to the conductive pathway 120 from a different power source 110. In the illustrated embodiment, the conductive pathways 118, 120, 122 do not extend along the entire length of the track 124. Instead, conductive pathways 118, 120, 122 may extend along consecutive portions of the track 124 while consecutive conductive pathways 118, 120, 122 remain electrically separate from each other. For example, electric current may be incapable of transferring from the conductive pathway 118 to the conductive pathway 120 without passing through the switch controller 126 or arcing across a gap between the conductive pathways 118, 120.

The control assemblies 136, 138 may operate based on instructions stored on a tangible and non-transitory computer readable medium, such as a hard drive, flash drive, DVD, and the like. Alternatively, the control assemblies 136, 138 may be manually operated. The control assemblies 136, 138 open or close the switches 134 using a switching module 130. The determination of which switches 134 are to open or close is based on information derived by a monitoring module 132.

The switching and monitoring modules 130, 132 may be embodied in instructions that communicate with each other to direct operations of the control assemblies 136, 138. For example, the switching and monitoring modules 130, 132 may be software that directs operations of one or more microcontrollers or processors. While the control assembly 138 is not illustrated as including the switching and monitoring modules 130, 132, the control assembly 138 may include switching and monitoring modules 130, 132 such as shown in control assembly 136. In another embodiment, the control assemblies 136, 138 and/or one or more of the switching and monitoring modules 130, 132 may be centrally located and remotely communicate with the switch controllers 126, 128.

One or more of the power sources 106, 108, 110, 112, 114, 116, for example, the power sources 106, 112, may be renewable energy power sources 106, 112. For example, the renewable energy power sources 106, 112 may supply electric current from a renewable natural resource, such as a non-fossil fuel based resource. Such natural resources include, but are not limited to, sunlight, wind, rain, tides, moving bodies of water, geothermal heat, biofuel, and the like. By way of example only, the renewable energy power sources 106, 112 may include wind turbines, hydrosystems, photovoltaic devices, heat pumps, and the like.

One or more of the power sources 106, 108, 110, 112, 114, 116, for example, the power sources 108, 114, may be utility power sources 108, 114. For example, the utility power sources 108, 114 may be an electric utility or company that generates, transmits, and/or distributes electric current to a general or specialized population, and may do so for sale in a regulated market or in an open market. The utility power sources 108, 114 may supply electric current to the rail vehicles 104 as well as to a population of people to power homes, buildings, other companies, and the like.

One or more of the power sources 106, 108, 110, 112, 114, 116, for example, the power sources 110, 116, may be chargeable energy stores 110, 116, also referred to as "energy stores." The energy stores 110, 116 include assemblies or devices that are capable of receiving and storing power from a source outside of the energy stores 110, 116. By way of example only, the energy stores 110, 116 may include one or more batteries, capacitors, flywheels, and the like. The energy stores 110, 116 are charged by electric current that is generated by another source 106, 108, 112, 114, the rail vehicles 104, and the like. A "charged" energy store 110, 116 is an energy store that has stored at least some power, but may not necessarily be completely full or fully charged. A charged energy store 110, 116 may be partially charged such that the energy store 110, 116 may supply the power as electric current to the rail vehicles 104 or to other electric loads.

The control assemblies 136, 138 may direct current from combinations of the power sources 106, 108, 110, 112, 114, 116 based on the type of conductive pathways 118, 120, 122 that convey the current to the rail vehicles 104. For example, the conductive pathways 118, 120, 122 may be single phase catenaries that are capable of transmitting a single phase current to the rail vehicles 104. In one embodiment, the control assemblies 136, 138 couple at least one of the utility power sources 108, 114 and at least one of the chargeable energy stores 110, 116 with the conductive pathways 118, 120, 122. The utility power sources 108, 114 may supply power to the conductive pathways 118, 120, 122 in the form of a three phase current that has a direct current component. By way of example only, the chargeable energy stores 110, 116 may supply a 120 Hz alternating current to the conductive pathways 118, 120, 122. The combination of the direct current of the utility power sources 108, 114 and the alternating current of the chargeable energy stores 110, 116 provides the conductive pathways 118, 120, 122 with a single phase current that has sufficient power to move the rail vehicles 104.

The rail vehicles 104 draw electrical power from one or more of the power sources 106, 108, 110, 112, 114, 116 to propel the rail vehicles 104. A power demand of the rail vehicles 104 represents the electrical power required to propel the rail vehicles 104 in one embodiment. The power demand is based on a load demand and other sources of electrical power. For example, the load demand represents the electrical power drawn by the rail vehicles 104 from off-board or external sources of electrical power, such as one or more of the power sources 106, 108, 110, 112, 114, 116. The other sources of electrical power may be on-board sources of electrical power, such as regenerative braking systems of the rail vehicles 104. The power demand required by the rail vehicles 104 may be a combination of the load demand (for example, current drawn from the power sources 106, 108, 110, 112, 114, 116) and the on-board sources of electrical power.

The control assemblies 136, 138 vary which of the power sources 106, 108, 110, 112, 114, 116 are electrically coupled with the conductive pathways 118, 120, 122 and are able to supply current to the rail vehicles 104 through the switches 134 based on the load demand of the rail vehicles 104. The load demand is determined by the monitoring module 132 and may be based on a variety of information. For example, the load demand may be based on a traffic density parameter.

Figure 2:
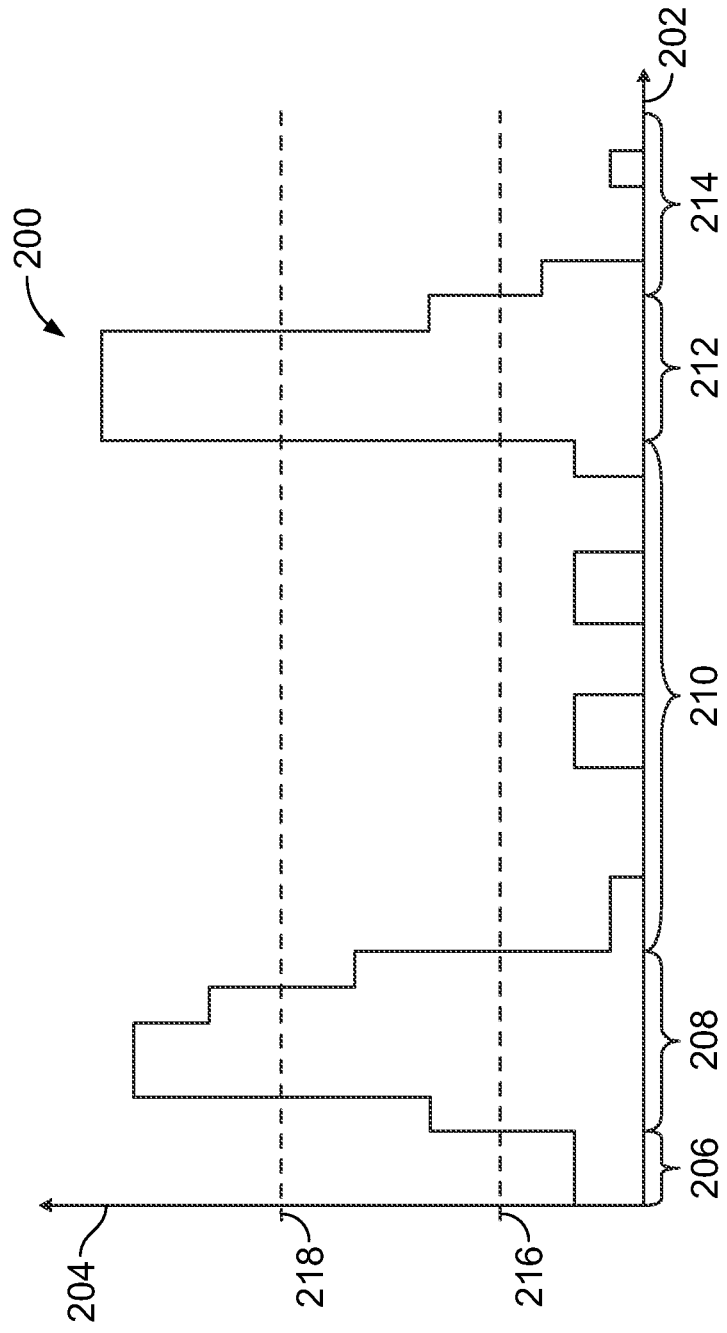
FIG. 2 illustrates an example of load demand of a rail vehicle shown in FIG. 1 that varies over time in accordance with one embodiment.

FIG. 2 illustrates an example of a load demand 200 that varies over time in accordance with one embodiment. As described above, the load demand 200 is determined by the monitoring modules 132 (shown in FIG. 1) of the control assemblies 136, 138 (shown in FIG. 1). The load demand 200 shown in FIG. 2 may represent the demand for power to electrify the rail vehicles 104 (shown in FIG. 1) along one or more of the conductive pathways 118, 120, 122 (shown in FIG. 1) and that is obtained from off-board sources of current, such as the power sources 106, 108, 110, 112, 114, 116 (shown in FIG. 1). In one embodiment, the load demand 200 may represent the net demand for power to electrify the rail vehicles 104. For example, the illustrated load demand 200 may represent the power demand of the rail vehicles 104 minus any regenerative braking current that is supplied by the rail vehicles 104 and used to power the rail vehicles 104. In other words, the load demand 200 may represent or otherwise relate to the electrical power drawn from the conductive pathways 118, 120, 122 by the rail vehicles 104, which is a function of the total electrical power required by the rail vehicles 104 less any electrical power generated on-board, such as from regenerative braking, that is used to power the rail vehicles 104 (as opposed to on-board generated electrical power that is transferred from the rail vehicle to the conductive pathway(s).

The load demand 200 is shown alongside a horizontal axis 202 representative of time and a vertical axis 204 representative of a magnitude of the load demand 200. The load demand 200 varies significantly with respect to time in the illustrated embodiment. As described above, the control assemblies 136, 138 (shown in FIG. 1) may change which of the power sources 106, 108, 110, 112, 114, 116 (shown in FIG. 1) supplies current to the rail vehicles 104 (shown in FIG. 1) based on the load demand 200. Depending on the load demand 200, more than one power source 106, 108, 110, 112, 114, 116, 118 may supply current to the rail vehicles 104 at the same time. Alternatively, the control assemblies 136, 138 may change which of the power sources 106, 108, 110, 112, 114, 116 supplies current to the rail vehicles 104 based on the power demand of the rail vehicles 104, which is a function of the load demand.

In one example, the load demand 200 is based on a traffic density parameter. The traffic density parameter represents how many rail vehicles 104 (shown in FIG. 1) are or are expected to be drawing power from one or more of the power sources 106, 108, 110, 112, 114, 116 (shown in FIG. 1) to travel along the track 124 (shown in FIG. 1) and/or the type of rail vehicles 104 travelling along the track 124. For example, a type of rail vehicle 104 may be defined by the weight and/or speed of travel of a rail vehicle 104. A larger traffic density parameter indicates that many rail vehicles 104 are or are expected to be travelling while a smaller traffic density parameter indicates that fewer rail vehicles 104 are or are expected to be travelling. By way of example only, the monitoring modules 132 (shown in FIG. 1) of the control assemblies 136, 138 (shown in FIG. 1) may measure the traffic density parameter based on the number of rail vehicles 104 travelling past a location, such as the control assembly 136 and/or 138. In another embodiment, the monitoring module 132 determines the traffic density parameter based on how many rail vehicles 104 are expected to be travelling along the track 124. The traffic density parameter may be a predetermined parameter that is based on a predetermined train schedule, the date, and/or the time of day. For example, the traffic density parameter may be set to be relatively large during the traditional rush hours during the working week and may decrease during non-rush hours and/or during the weekends.

As shown in FIG. 2, the load demand 200 is relatively small during time periods 206, 210, 214 and relatively large during time periods 208, 212. The time periods 206, 210, 214 associated with the smaller load demand 200 may be referred to as "low traffic periods" while the time periods 208, 212 associated with the larger load demand 200 may be referred to as "high traffic periods." By way of example only, the high traffic periods 208, 212 may occur during rush hours of a working week while the low traffic periods 206, 210, 214 may occur between rush hours or at night. During low traffic periods 206, 210, 214, the load demands of the rail vehicles 104 (shown in FIG. 1) can be relatively high for relatively short periods of time.

In another embodiment, the load demand 200 may be based on an electric load parameter of the conductive pathway 118, 120, and/or 122. The electric load parameter may represent the electric current and/or power that is demanded by the rail vehicles 104 (shown in FIG. 1) along one or more of the conductive pathways 118, 120, 122. In general, as more rail vehicles 104 are powered by current supplied along the conductive pathways 118, 120, 122, the electric load along the conductive pathways 118, 120, 122 increases. Conversely, as fewer rail vehicles 104 are powered by current supplied along the conductive pathways 118, 120, 122, the electric load decreases. The electric load may be based on one or more other factors, such as the geography of the area over which the track 124 (shown in FIG. 1) extends. If the track 124 includes several steep uphill grades, then the electric load may increase over the portions of the track 124 that include the uphill grades. Conversely, if the track 124 includes several steep downhill grades, then the electric load may decrease over the portions of the track 124 that include the downhill grades.

The load demand 200 may be based on a power supply parameter of the renewable energy power sources 106, 112. The power supply parameter represents the current or power that the renewable energy power sources 106, 112 are capable of producing based on ambient conditions. The renewable energy power sources 106, 112 may supply a larger current to the rail vehicles 104 when the ambient conditions are favorable for generating the current and may supply a lesser current when the ambient conditions are unfavorable. For example, if the renewable energy power sources 106, 112 include wind turbines, the renewable energy power sources 106, 112 may increase the current supplied by the renewable energy power sources 106, 112 when the wind is blowing but may decrease the current when the wind is not blowing. In another example, if the renewable energy power sources 106, 112 include solar panels, the renewable energy power sources 106, 112 may increase the current supplied by the renewable energy power sources 106, 112 when the sun is shining brightly but may decrease the current when the sun is not shining brightly, such as on an overcast day or when raining.

The load demand 200 may be based on a cost parameter. The cost parameter represents a financial measure of supplying current to the rail vehicles 104 (shown in FIG. 1) from one or more of the power sources 106, 108, 110, 112, 114, 116 (shown in FIG. 1). The cost of supplying current from the different power sources 106, 108, 110, 112, 114, 116 may vary with respect to date and/or time. For example, the utility power sources 108, 114 may charge customers different amounts based on the time of day that the current is drawn from the utility power sources 108, 114. In the illustrated embodiment, the load demand 200 is relatively large during the time periods 208, 212 and is relatively small during the time periods 206, 210, 214. The load demand 200 may indicate that the utility power source 108 and/or 114 is charging more per kilowatt hour for power during the time periods 208, 212 than during the time periods 206, 210, 214.

The above embodiments are just a few examples of the different parameters and factors on which the load demand 200 may be based. The load demand 200 may be based or depend upon other parameters, measures, or factors related to the power supplied by the power sources 106, 108, 110, 112, 114, 116 (shown in FIG. 1), the rail vehicles 104 (shown in FIG. 1), and/or the track 124 (shown in FIG. 1), for example. In one embodiment, the load demand 200 is based on a combination of parameters. For example, the load demand 200 may depend on two or more of the traffic density parameter, the cost parameter, and the electric load described above.

In operation, the monitoring module 132 (shown in FIG. 1) of the control assemblies 136, 138 (shown in FIG. 1) determines the load demand 200 based on one or more parameters and communicates the load demand 200 to the switching module 130 (shown in FIG. 1). Based on the load demand 200, the switching module 130 may change which of the power sources 106, 108, 110, 112, 114, 116 (shown in FIG. 1) supplies current to the rail vehicles 104 (shown in FIG. 1) along the conductive pathways 118, 120, 122 (shown in FIG. 1). The switching module 130 may allow one or more of the power sources 106, 108, 110, 112, 114, 116 to supply the current to the conductive pathways 118, 120, and/or 122 based on a comparison of the load demand 200 to one or more predetermined thresholds. If the load demand 200 crosses the threshold, such as by increasing above or decreasing below a threshold, then the switching module 134 may change which of the power sources 106, 108, 110, 112, 114, 116 supplies current to the rail vehicles 104.

In one embodiment, if the load demand 200 is based on the traffic density parameter described above, the switching module 130 (shown in FIG. 1) changes which power sources 106, 108, 110, 112, 114, 116 (shown in FIG. 1) deliver current to the rail vehicles 104 based on the traffic of the rail vehicles 104. For example, the switching module 130 may migrate the source or supply of current from one or more power sources 106, 108, 110, 112, 114, 116 to one or more different power sources 106, 108, 110, 112, 114, 116 based on the amount of traffic. By "migrate," it is meant that the switching module 130 changes the supply of current from one or more power sources 106, 108, 110, 112, 114, 116 to one or more additional or different power sources 106, 108, 110, 112, 114, 116. For example, the switching module 130 may migrate the supply of current from a first set of the power sources 106, 108, 110, 112, 114, 116 to a different second set of the power sources 106, 108, 110, 112, 114, 116. The first and second sets include one or more power sources 106, 108, 110, 112, 114, 116 that differ from each other.

The control assembly 100 may compare the load demand 200 to a predetermined threshold 216, such as a traffic density threshold. If the load demand 200 is less than the threshold 216, then the load demand 200 may indicate that a relatively small number of rail vehicles 104 (shown in FIG. 1) are travelling along the track 124 (shown in FIG. 1) and requiring current from the power sources 106, 108, 110, 112, 114, 116. As a result, the switching module 130 may close one or more switches 134 (shown in FIG. 1) to allow the chargeable energy stores 110 and/or 116 to supply the current demanded by the rail vehicles 104. The switching module 130 may open one or more switches 134 to prevent other power sources 106, 108, 110, 112, 114, 116, such as the utility power sources 108, 114 and/or the renewable energy power sources 106, 112, from supplying current to the rail vehicles 104. For example, during relatively low traffic on the track 124, the power used to run the rail vehicles 104 may come from the chargeable energy stores 110, 116.

During periods of relatively low traffic, the control assembly 100 (shown in FIG. 1) may direct the switching module 130 (shown in FIG. 1) to supply lower frequency current to the rail vehicles 104 from the chargeable energy stores 110, 116 (shown in FIG. 1). By way of example only, the switching module 130 can couple the chargeable energy stores 110, 116 with the conductive pathways 118, 120, 122 (shown in FIG. 1) to supply 120 Hz current to the rail vehicles 104. When the traffic density increases, such as above the threshold 216, the control assembly 100 may direct the switching module 130 to couple other power sources, such as the renewable energy power sources 106, 112 (shown in FIG. 1) and/or the utility power sources 108, 114 (shown in FIG. 1), with the conductive pathways 118, 120, 122. The power sources 106, 108, 112, 114 can supply higher frequency current to the rail vehicles 104 when compared to the current supplied by the chargeable energy stores 110, 116.

Alternatively, when the load demand 200 does not exceed the threshold 216, or the traffic is relatively low, the switching module 130 (shown in FIG. 1) may supply current to the rail vehicles 104 from the renewable energy power source 106, 112 (shown in FIG. 1) and/or the utility power source 108, 114 (shown in FIG. 1) and prevent the chargeable energy store 110, 116 (shown in FIG. 1) from supplying current. For example, the switching module 130 may prevent energy stored in the chargeable energy store 110, 116 from being supplied to the rail vehicles 104 (shown in FIG. 1) and depleted when the load demand 200 is low. When the load demand 200 increases above the threshold 216, the switching module 130 may augment the current supplied to the rail vehicles 104 from the renewable energy power source 106, 112 and/or utility power source 108, 114 with current from the chargeable energy stores 110, 116.

In one embodiment, the switching module 130 (shown in FIG. 1) changes which power sources 106, 108, 110, 112, 114, 116 (shown in FIG. 1) supply current to the rail vehicles 104 (shown in FIG. 1) based on a predicted or anticipated future load demand 200. The load demand 200 for a section of the track 124 (shown in FIG. 1) may be known to vary according to a predetermined pattern based on a history of traffic patterns, previous load demands, and the like. For example, the load demand 200 during rush hours of a metropolitan area may be fairly consistent over time. The switching module 130 may change which power sources 106, 108, 110, 112, 114, 116 supply current to the rail vehicles 104 in order to conserve power. By way of example only, if a future load demand 200 is expected to be relatively large when compared to a current load demand 200, the switching module 130 may prevent the chargeable energy store 110, 116 from supplying current to the rail vehicles 104 in order to conserve the energy stored in the chargeable energy store 110, 116 for the expected future high load demand 200.

If the load demand 200 is based on the electric load described above, the switching module 130 (shown in FIG. 1) may change which power sources 106, 108, 110, 112, 114, 116 (shown in FIG. 1) deliver current to the rail vehicles 104 (shown in FIG. 1) based on the load demand of the rail vehicles 104. By way of example only, the switching module 130 may compare the load demand 200 to a threshold 216, such as a load demand threshold. If the load demand 200 is less than the threshold 216, then the load demand 200 may indicate that the demand of the rail vehicles 104 for current is relatively low and less power and/or current is needed to drive the rail vehicles 104 along the track 124 (shown in FIG. 1). As a result, the switching module 130 may open one or more of the switches 134 (shown in FIG. 1) to prevent one or more of the power sources 106, 108, 110, 112, 114, 116 from delivering current to the conductive pathways 118, 120, 122 (shown in FIG. 1). The switching module 130 may close one or more of the switches 134 to permit other power sources 106, 108, 110, 112, 114, 116 to supply current to the rail vehicles 104. For example, during relatively low load demands 200 of the rail vehicles 104, current may be supplied by fewer power sources 106, 108, 110, 112, 114, 116 compared to periods of higher load demand 200.

In one embodiment, the switching module 130 (shown in FIG. 1) augments the power and/or current supplied by one or more power sources 106, 108, 110, 112, 114, 116 (shown in FIG. 1). When the load demand 200 exceeds the threshold 216 or a greater threshold 218, the switching module 130 may close one or more of the switches 134 (shown in FIG. 1) to permit additional power sources 106, 108, 110, 112, 114, 116 to deliver current to the rail vehicles 104. By way of example only, if the utility power sources 108, 114 are supplying current to the rail vehicles 104 when the load demand 200 exceeds the threshold 216, the switching module 130 may close one or more of the switches 134 to permit the renewable energy power sources 106, 112 and/or the chargeable energy stores 110, 116 to supply additional current to the rail vehicles 104. Alternatively, if the utility power sources 108, 114 and/or the renewable energy power sources 106, 112 are supplying current to the rail vehicles 104 when the load demand 200 is below the threshold 216, the switching module 130 may close one or more of the switches 134 to permit the chargeable energy stores 110, 116 to supply additional current to the rail vehicles 104 when the load demand 200 exceeds the threshold 216. For example, if the utility power sources 108, 114 are only able to supply 5 kW of power to the rail vehicles 104 but the rail vehicles 104 demand 10 kW of power more than the power supplied by on-board sources of current, the chargeable energy stores 110, 116 may supply the additional 5 kW demanded by the rail vehicles 104. The addition of more power sources 106, 108, 110, 112, 114, 116 supplying current to the rail vehicles 104 augments the current that was being provided in order to meet the increased load demand. Such load demand may occur, for example, during rush hour of a metropolitan area.

If the load demand 200 is based on the cost parameter described above, the switching module 130 (shown in FIG. 1) may change which power sources 106, 108, 110, 112, 114, 116 (shown in FIG. 1) deliver current to the rail vehicles 104 (shown in FIG. 1) based on relative costs of the current. The switching module 130 may compare the cost of supplying current from different power sources 106, 108, 110, 112, 114, 116 at one or more times during the day. Based on this comparison of costs, the switching module 130 may direct the switch controller 126, 128 (shown in FIG. 1) to open or close one or more of the switches 134 (shown in FIG. 1). For example, the switches 134 that couple the conductive pathways 118, 120, and/or 122 with a first power source 106, 108, 110, 112, 114, 116 that is providing less expensive current than a second power source 106, 108, 110, 112, 114, 116 may be closed. The switches 134 that couple the more expensive second power source 106, 108, 110, 112, 114, 116 may be opened. As a result, current is supplied to the rail vehicles 104 by the less expensive power source 106, 108, 110, 112, 114, 116.

Figure 3:
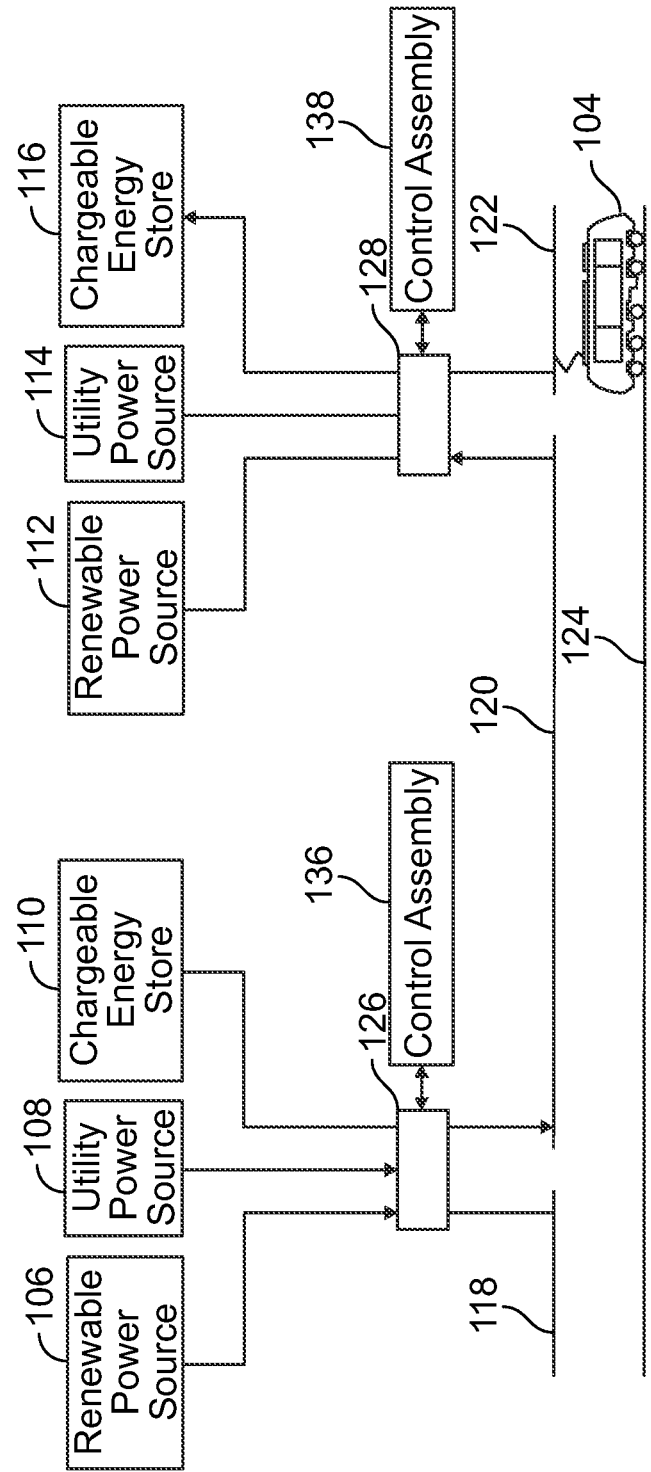
FIG. 3 is a diagram of the electrified rail system shown in FIG. 1 directing current to a chargeable energy store shown in FIG. 1 in accordance with one embodiment.

FIG. 3 is a diagram of the electrified rail system 100 directing current to the chargeable energy store 116 in accordance with one embodiment. As described above, the chargeable energy stores 110, 116 may receive current and be charged by the current. The charged energy stores 110, 116 then can deliver the stored current to the rail vehicles 104 along one or more of the conductive pathways 118, 120, 122. One or more of the conductive pathways 118, 120, 122 is used as a transmission line to convey the current from one or more of the power sources 106, 108, 110, 112, 114, 116 to one or more of the energy stores 110, 116 to charge the energy stores 110, 116. For example, a catenary that is represented by the conductive pathway 120 may be used to transmit current from one or more power sources 106, 108, 110 to the energy store 116. One or more of the conductive pathways 118, 120, 122 may be used to deliver current to the rail vehicles 104 while also supplying current to one or more of the energy stores 110, 116.

In the example shown in FIG. 3, the control assembly 136 directs the switch controller 126 to close the switches 134 (shown in FIG. 1) that permit one or more of the power sources 106, 108, 110 to transmit current to the conductive pathway 120. The control assembly 138 directs the switch controller 128 to close the switches 134 that permit the current carried by the conductive pathway 120 to be delivered to the energy store 116. In doing so, a current-carrying circuit is formed that extends from one or more of the power sources 106, 108, 110, through the conductive pathway 120, and to the energy store 116. Current is delivered to the energy store 116 along the circuit in order to charge the energy store 116. The unidirectional arrows shown in FIG. 3 represent the flow of current from the power sources 106, 108 to the switch controller 126, from the switch controller 126 to the conductive pathway 120, from the conductive pathway 120 to the switch controller 128, and from the switch controller 128 to the chargeable energy store 116. While one circuit is shown and described in connection with FIG. 3, other circuits may be formed in order to charge one or more of the energy stores 110, 116 using current supplied by one or more of the other power sources 106, 108, 110, 112, 114, 116.

The chargeable energy store 110 may be unable to be quickly charged by the regenerated current from rail vehicles 104 and/or the current from another power source 106, 108, 112, 114. The control assembly 136 may slow the rate at which current is supplied to the chargeable energy store 110. For example, the control assembly 136 may increase the rate at which regenerated current and/or current from another power source 106, 108, 112, 114 is supplied to the chargeable energy store 110 such that the current is supplied at a relatively low rate that is gradually increased to a faster rate.

Using the conductive pathways 118, 120, and/or 122 to transmit current from one or more of the power sources 106, 108, 110, 112, 114, 116 to the energy store 110 and/or 116 may reduce costs involved in constructing and/or maintaining electrified rail systems. Transmitting current between substations along the conductive pathways 118, 120, 122 can reduce the need for feeder lines or cables that otherwise carry current between the substations. For example, instead of charging an energy store 110, 116 from current carried by an extra feeder line or cable that runs along the track 124, the conductive pathways 118, 120, 122 may deliver the current to the energy store 110, 116.

The conductive pathways 118, 120, and/or 122 may be used to transmit current from one or more power sources 106, 108, 110, 112, 114, 116 to another conductive pathway 118, 120, 122 that is not coupled to the one or more power sources 106, 108, 110, 112, 114, 116 by the switch controller 126 or 128. For example, in the illustrated embodiment, the conductive pathways 118 and 120 are coupled with the power sources 106, 108, 110 by the switch controller 126. The conductive pathways 120 and 122 are coupled with the power sources 112, 114, 116 by the switch controller 128. Only the conductive pathway 120 is coupled with the power sources 106, 108, 110, 112, 114, 116 by both switch controllers 126, 128 in the illustrated embodiment. If one or more of the power sources 112, 114, 116 fail and/or are incapable of supplying sufficient current to the conductive pathway 122 in order to power the rail vehicles 104 receiving current from the conductive pathway 122, then the switch controllers 126, 128 may couple the power sources 106, 108, and/or 110 with the conductive pathway 122. For example, the switch controller 126 may couple the power sources 106, 108, and/or 110 with the conductive pathway 120, and the switch controller 128 may electrically couple the conductive pathway 120 with the conductive pathway 122. Consequently, the power sources 106, 108, and/or 110 are able to supply power to the conductive pathway 122 that is not coupled with the power sources 106, 108, 110 by one of the switch controllers 126, 128.

Figure 4:
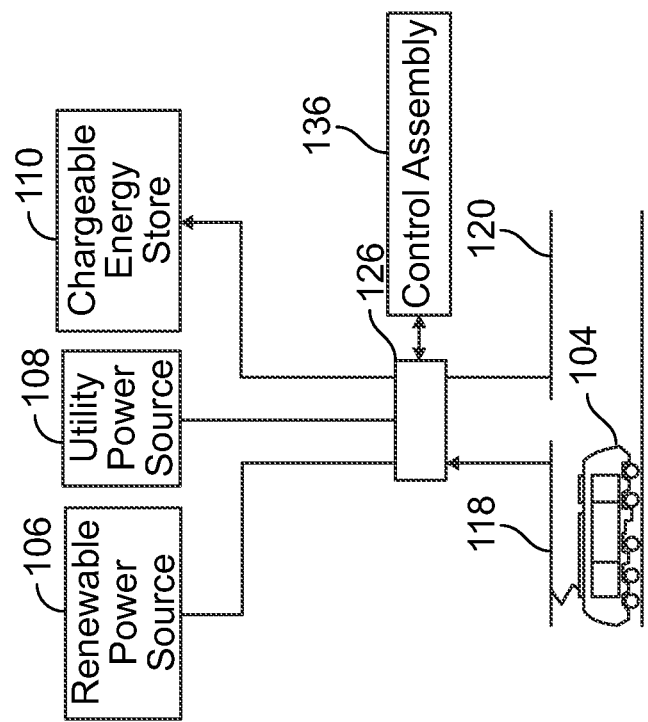
FIG. 4 is a diagram of the electrified rail system shown in FIG. 1 capturing regenerated current from the rail vehicle shown in FIG. 1 in accordance with one embodiment.

FIG. 4 is a diagram of the electrified rail system 100 capturing regenerated current from a rail vehicle 104 at the chargeable energy store 110 in accordance with one embodiment. While the description herein focuses on the control assembly 136, energy store 110, and conductive pathways 118, 120, the description may equally apply to the control assembly 138 (shown in FIG. 1), energy store 116 (shown in FIG. 1), and/or conductive pathway 122 (shown in FIG. 1).

As described above, the chargeable energy store 110 may receive current and be charged by the current. The charged energy store 110 can deliver the stored current to the rail vehicles 104 along one or more of the conductive pathways 118, 120. In one embodiment, a rail vehicle 104 may have a regenerative braking system that slows down movement of the rail vehicle 104 by converting energy of the rail vehicle 104 into electric current. For example, the rail vehicle 104 may convert potential and/or kinetic energy of the rail vehicle 104 into current. The current that is created by the rail vehicle 104 may be referred to as regenerated electric current.

In the illustrated embodiment, regenerated electric current is created by one or more rail vehicles 104 and is transmitted on the conductive pathway 118 to the switch controller 126. The control assembly 136 directs the switch controller 126 to close and/or open one or more switches 134 (shown in FIG. 1) to convey the regenerated current to the energy store 110. The energy store 110 receives and stores at least some of the regenerated current. For example, the energy store 110 may receive and be charged by the regenerated current. The unidirectional arrows shown in FIG. 4 represent the flow of regenerated current from the rail vehicle 104 and the conductive pathway 118 to the switch controller 126 and from the switch controller 126 to the energy store 110.

Directing the regenerated current to the energy store 110 may enable the regenerated current to be used to power one or more of the rail vehicles 104. For example, after charging the energy store 110 using at least some regenerated current, the charged energy store 110 may deliver current to the rail vehicles 104 as described above. In one embodiment, one or more of the power sources 106, 108 other than the energy store 110 have voltage and/or current limits on the regenerated current that the power source 106 and/or 108 can receive. For example, the utility power source 108 may have a limit on how much regenerated current that the utility power source 108 can safely receive from the rail vehicles 104. If the regenerated current exceeds the limits of the utility power source 108, the utility power source 108 may prevent the regenerated current from being transmitted to the utility power source 108. Directing the regenerated current to the energy store 110 instead of the utility power source 108 may avoid overloading the utility power source 108 with the regenerated current.

Alternatively, regenerated electric current from the rail vehicles 104 may be transmitted to the switch controller 126 and transferred to the utility power source 108. For example, the regenerated current may be supplied back to the utility power source 108 to reduce the total power consumed by the rail vehicles 104. Although not shown in FIG. 3, one or more electric conversion components 140 (shown in FIG. 1) of the switch controller 126 may convert a direct current of the regenerated current into an alternating current that is accepted by the utility power source 108. The utility power source 108 may be unwilling or incapable of receiving a direct current and may require that only alternating current be supplied back to the utility power source 108. As a result, the switch controller 126 can convert the regenerated direct current to an alternating current prior to supplying the current to the utility power source 108.

In operation, the rail vehicles 104 may generate relatively large regenerated currents. For example, the regenerated current created by the rail vehicles 104 may be on the order of several megawatts of power. During low periods of relatively low traffic, the utility power source 108 may be incapable of receiving such large regenerated current from the rail vehicles 104 in a relatively short period of time. As a result, the switch controller 126 may direct some of the regenerated current to the chargeable energy store 110 and some of the regenerated current to the utility power source 108. For example, the bulk of the regenerated current may be stored in the chargeable energy store 110 while a relatively small amount of the regenerated current is directed to the utility power source 108. The switch controller 126 may then direct more of the regenerated current that is stored as energy in the chargeable energy store 110 to the utility power source 108 over an extended period of time. For example, the switch controller 126 can slowly direct the regenerated current from the chargeable energy store 110 to the utility power source 108 over several hours. Slowly passing the regenerated current in this manner can enable the utility power source 108 to receive the relatively large regenerated current from the rail vehicles 104.

Conversely, during periods of relatively high traffic, the utility power source 108 may be capable of receiving the bulk or all of the regenerated current from the rail vehicles 104. The switch controller 126 can direct the regenerated current to the utility power source 108 without first sending the regenerated current to the chargeable energy store 110 during such high traffic periods.

The control assembly 136 may vary where regenerated current is directed by the switch controller 126 based on the load demand 200 (shown in FIG. 2). For example, when the load demand 200 is relatively low, such as below the threshold 216 (shown in FIG. 2), the control assembly 136 may direct the switch controller 126 to direct regenerated current into the chargeable energy store 110 and prevent the regenerated current from being transmitted to the utility power source 108. The control assembly 136 then gradually increases the amount of regenerated current that is conveyed to the utility power source 108 and gradually decreases the amount of regenerated current that is sent to the chargeable energy store 110 in one embodiment. For example, the control assembly 136 may gradually change the recipient of the regenerated current from the chargeable energy store 110 to the utility power source 108 over a predetermined period of time, as opposed to completely switching the path of the regenerated current from the chargeable energy store 110 to the utility power source 108.

On the other hand, if the load demand 200 (shown in FIG. 2) is relatively high, such as above the threshold 216 (shown in FIG. 2), then the control assembly 136 may direct the switch controller 126 to direct the regenerated current to the utility power source 108. For example, the control assembly 136 may direct the regenerated current to the utility power source 108 without first sending the regenerated current to the chargeable energy store 110 and gradually switching over to the utility power source 108.

In one embodiment, the control assembly 136 varies the voltage that is supplied to the rail vehicles 104 along the conductive pathways 118, 120 in order to control the speed of the rail vehicles 104. The control assembly 136 can control the speed of the rail vehicles 104 in the absence of a separate communication or control signal that is communicated to the rail vehicles 104 by varying the voltage supplied to the rail vehicles 104. For example, the control assembly 136 may control the magnitude of the voltage supplied from the chargeable energy store 110 to the rail vehicles 104. The speed of the rail vehicles 104 can depend on the magnitude of the voltage supplied to the rail vehicles 104. If the supplied voltage is decreased by the control assembly 136, the rail vehicles 104 may slow down. Conversely, if the supplied voltage is increased, the rail vehicles 104 may speed up.

Figure 5:
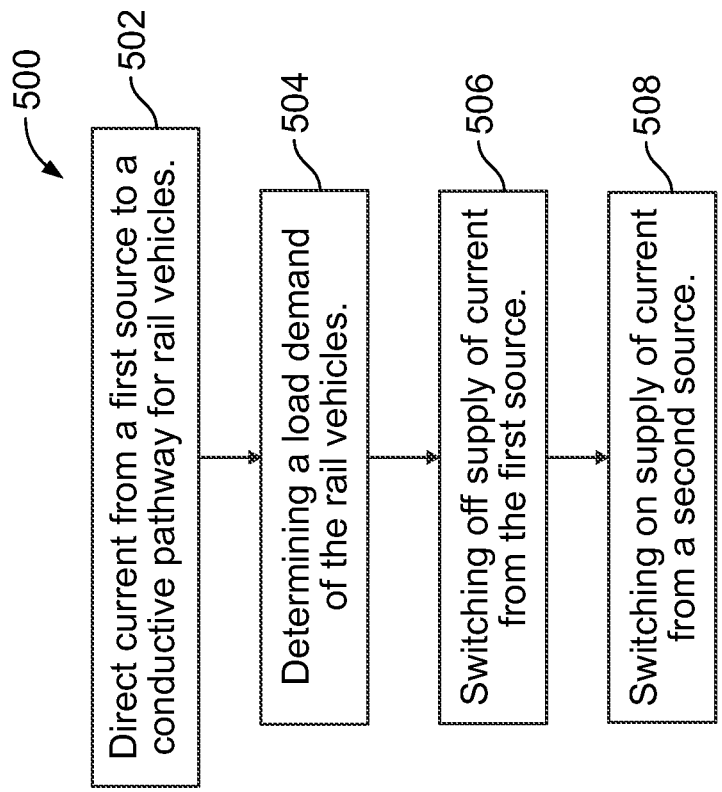
FIG. 5 is a flowchart of a method for migrating supply of electric current from a first power source to a second power source in accordance with one embodiment.

FIG. 5 is a flowchart of a method 500 for migrating supply of electric current from a first power source to a second power source in accordance with one embodiment. At 502, current from a first power source is directed to a conductive pathway. Rail vehicles traveling along a track receive the current from the conductive pathway in order to power the rail vehicles. For example, one or more of the power sources 106, 108, 110, 112, 114, 116 (shown in FIG. 1) may deliver current to the conductive pathway 118, 120, and/or 122 (shown in FIG. 1) to power the rail vehicles 104 (shown in FIG. 1).

At 504, a load demand of the rail vehicles is determined. For example, as described above, the load demand 200 (shown in FIG. 2) may be determined based on one or more parameters, such as a traffic density parameter, an electric load, a cost parameter, and the like. At 506, the supply of current from the first power source is switched off based on the load demand. For example, if the load demand 200 of the rail vehicles 104 (shown in FIG. 1) increases above a threshold 216 (shown in FIG. 2), the switch controller 126 (shown in FIG. 1) may open a switch 134 (shown in FIG. 1) that prevents the energy store 110 (shown in FIG. 1) from supplying current to the conductive pathway 118, 120, and/or 122 (shown in FIG. 1). In another example, if the load demand 200 of the rail vehicles 104 decreases below the threshold 216, the switch controller 126 may open a switch 134 that prevents the utility power source 108 (shown in FIG. 1) from supplying current to the conductive pathway 118, 120, and/or 122. Alternatively, at 504, a power demand of the rail vehicles may be determined. The power demand may be a function of the load demand and include the electric power supplied by onboard sources of current, such as regenerative braking systems.

At 508, the supply of current from the second power source is switched on based on the load demand. For example, if the load demand 200 (shown in FIG. 2) of the rail vehicles 104 (shown in FIG. 1) increases above the threshold 216 (shown in FIG. 2), the switch controller 126 (shown in FIG. 1) may close a switch 134 (shown in FIG. 1) that permits the utility power source 108 (shown in FIG. 1) to supply current to the conductive pathway 118, 120, and/or 122 (shown in FIG. 1). In another example, if the load demand 200 decreases below the threshold 216, the switch controller 126 may open a switch 134 that permits the energy store 110 (shown in FIG. 1) to supply current to the conductive pathway 118, 120, and/or 122.

Figure 6:
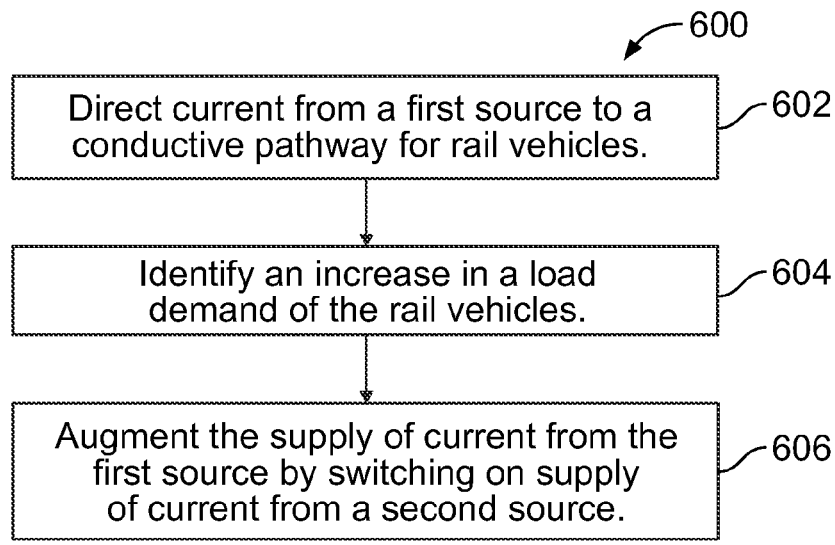
FIG. 6 is a flowchart of a method for augmenting a supply of current from a first power source with current from a second power source in accordance with one embodiment.

FIG. 6 is a flowchart of a method 600 for augmenting a supply of current from a first power source with current from a second power source in accordance with one embodiment. At 602, current is directed from the first power source to a conductive pathway in order to power one or more rail vehicles. For example, the energy store 110 (shown in FIG. 1) may supply current to the conductive pathway 118, 120, and/or 122 to power the rail vehicles 104 (shown in FIG. 1).

At 604, an increase in a load demand of the rail vehicles is identified. For example, the load demand 200 (shown in FIG. 2) of the rail vehicles 104 (shown in FIG. 1) may increase above a threshold 216 and/or 218 (shown in FIG. 2). At 606, based on the increase in the load demand, the supply of current from the first source is augmented by supplying additional current from a second source. For example, the switch controller 126 (shown in FIG. 1) may close switches 134 (shown in FIG. 1) to permit both the utility power source 108 (shown in FIG. 1) and the energy store 110 (shown in FIG. 1) to supply current to the conductive pathway 118, 120, and/or 122. The control assembly 136 (shown in FIG. 1) may direct the switch controller 126 to close the switches 134 based on the increase in the load demand 200.

Figure 7:
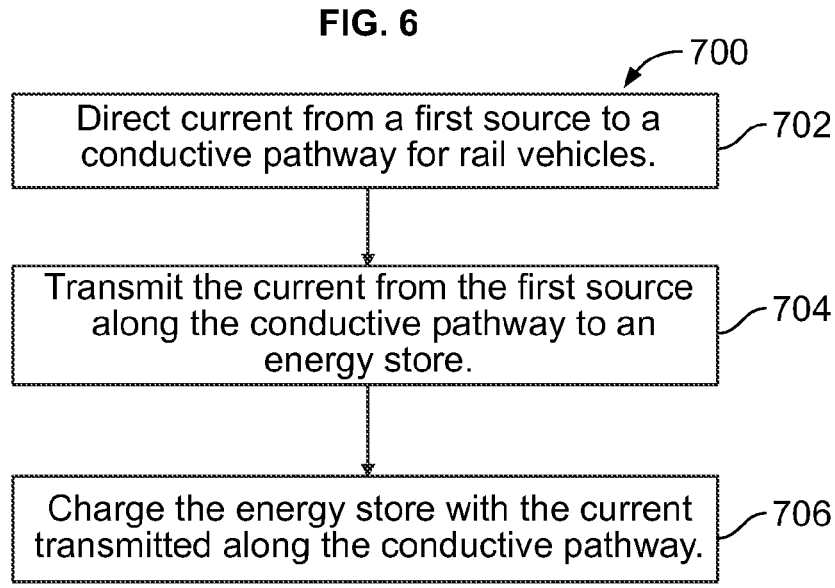
FIG. 7 is a flowchart of a method for transmitting current along a conductive pathway for rail vehicles to charge a chargeable energy store in accordance with one embodiment.

FIG. 7 is a flowchart of a method 700 for transmitting current along a conductive pathway for rail vehicles to charge a chargeable energy store in accordance with one embodiment. At 702, current is directed from a first power source to a conductive pathway. The conductive pathway may be a conductor that supplies power to electrified rail vehicles. For example, current may be supplied from the renewable and/or utility power sources 106, 108 (shown in FIG. 1) to the conductive pathway 120 (shown in FIG. 1). The conductive pathway 120 may be a catenary of an electrified rail system.

At 704, the current is transmitted using the conductive pathway to a chargeable energy store. For example, the current may be conveyed along the conductive pathway 120 (shown in FIG. 1) to the energy store 116 (shown in FIG. 1). The current may pass from the renewable and/or utility power sources 106, 108 (shown in FIG. 1), through the switch controller 126 (shown in FIG. 1), along the conductive pathway 120, through the switch controller 128 (shown in FIG. 1), and to the energy store 116.

At 706, the energy store is charged by the current received from the conductive pathway. For example, the energy store 116 (shown in FIG. 1) may receive the current transmitted along the conductive pathway 120 (shown in FIG. 1) and be charged by the current. The charged energy store 116 may then transmit current back to the conductive pathway 118, 120, and/or 122 (shown in FIG. 1) to power the rail vehicles 104 (shown in FIG. 1).

Figure 8:
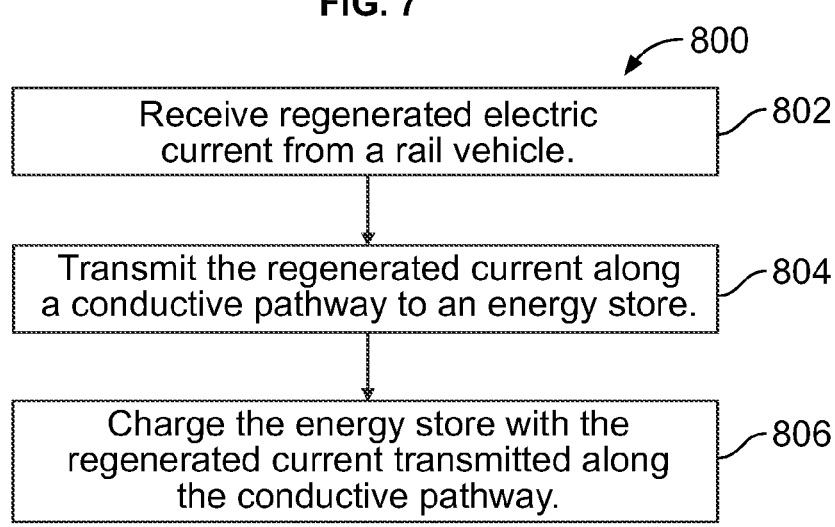
FIG. 8 is a flowchart of a method for capturing regenerated current created by a rail vehicle in accordance with one embodiment.

FIG. 8 is a flowchart of a method 800 for capturing regenerated current created by a rail vehicle in accordance with one embodiment. At 802, regenerated current is received along a conductive pathway. The regenerated current may be current that is created by a regenerative braking system of an electrified rail vehicle 104 (shown in FIG. 1), for example. In one embodiment, the regenerated current is transmitted from the rail vehicle 104 to the conductive pathway 118, 120, and/or 122 (shown in FIG. 1), such as an overhead catenary.

At 804, the regenerated current is transmitted along the conductive pathway to a chargeable energy store. For example, the regenerated current from the rail vehicle 104 (shown in FIG. 1) may be conveyed along the conductive pathway 118, 120, and/or 122 (shown in FIG. 1), through the switch controller 126 and/or 128 (shown in FIG. 1), and to the energy store 110 and/or 116 (shown in FIG. 1).

At 806, the regenerated current is received by the energy store and charges the energy store. For example, the energy store 110 and/or 116 (shown in FIG. 1) may receive the regenerated current and be at least partially charged by the regenerated current. The charged energy store 110, 116 may then transmit current back to one or more of the conductive pathways 118, 120, 122 (shown in FIG. 1) to power the rail vehicles 104 (shown in FIG. 1).

An embodiment relates to a control assembly for an electrified rail system. The control assembly comprises a monitoring module and a switching module. The monitoring module determines a load demand of a plurality of rail vehicles traveling along a track. The rail vehicles are supplied with electric current from a plurality of power sources over a conductive pathway (e.g., catenary or third rail) that extends along the track. The switching module is communicatively coupled with the monitoring module and joined with a switch controller that is disposed between the power sources and the conductive pathway. The switching module directs the switch controller to change which of one or more of the power sources supply the electric current to the rail vehicles over the conductive pathway based on the load demand. In on aspect, when only a first rail vehicle is traveling along the track, the load demand, as determined by the monitoring module, is a function of the first rail vehicle.

In another aspect, the monitoring module determines the load demand based on at least one of: a traffic density parameter of the rail vehicles; an electric load parameter of the rail vehicles; a power supply parameter representative of electric current that one or more of the plurality of power sources is capable of producing based on an ambient condition; an anticipated future load demand of the rail vehicles; and/or a cost parameter of supplying the electric current from one or more of the power sources.

In another aspect, the plurality of power sources includes a chargeable energy store and at least one of a renewable energy power source and/or a utility power source. The switching module directs the switch controller to migrate supply of the electric current to the rail vehicles between the energy store and the at least one of the renewable energy power source and/or the utility power source when the load demand decreases below a threshold.

In another aspect, the plurality of power sources includes a chargeable energy store and at least one of a renewable energy power source and/or a utility power source. The switching module directs the switch controller to migrate supply of the electric current to the rail vehicles between the energy store and the at least one of the renewable energy power source and/or the utility power source when the load demand increases above a threshold.

In another aspect, the switching module directs the switch controller to increase the electric current supplied to the rail vehicles from a first power source of the plurality of power sources with additional electric current supplied by a second power source of the plurality of sources based on the load demand, by permitting the second power source to transmit the additional electric current to the conductive pathway.

In another aspect, the plurality of power sources includes a chargeable energy store and at least one of a renewable energy power source and/or a utility power source. The switching module charges the energy store by directing the switch controller to permit the at least one of the renewable energy power source and/or the utility power source to transmit electric current to the energy store along the conductive pathway.

In another aspect, the switching module instructs the switch controller to direct regenerated electric current from the rail vehicles to a chargeable energy store along the conductive pathway.

In another aspect, the monitoring module controls a respective speed of each of the rail vehicles by varying a voltage supplied to the rail vehicles along the conductive pathway.

In another aspect, at least one of the power sources includes a chargeable energy store, and the switching module directs the electric current to the rail vehicles from the chargeable energy store along the conductive pathway.

Another embodiment relates to an electrified rail system. The electrified rail system comprises: at least first, second, and third conductive pathways located along a track on which rail vehicles travel (i.e., the conductive pathways, such as third rails or catenary lines, are off-board the vehicles), wherein the rail vehicles draw electric current from the conductive pathways, and wherein the conductive pathways are electrically isolated from one another; a first switch controller disposed between a first plurality of power sources (e.g., mid-capacity and/or high capacity power sources such as renewable energy power sources and utility power sources) and the first and second conductive pathways, wherein the first switch controller is controllable to selectively connect and disconnect the first plurality of power sources to the first and second conductive pathways (that is, the first switch controller can be controlled to connect any one or more of the first plurality of power sources to the first and second conductive pathways); a second switch controller disposed between a second plurality of power sources and the second and third conductive pathways, wherein the second switch controller is controllable to selectively connect and disconnect the second plurality of power sources to the second and third conductive pathways (that is, the second switch controller can be controlled to connect any one or more of the second plurality of power sources to the second and third conductive pathways); a first control assembly comprising a first monitoring module and a first switching module communicatively coupled with the first monitoring module, wherein the first switching module is joined with the first switch controller; and a second control assembly comprising a second monitoring module and a second switching module communicatively coupled with the second monitoring module, wherein the second switching module is joined with the second switch controller; wherein the first and second monitoring modules are configured to determine a load demand of the rail vehicles traveling along the track, and wherein the first and second switching modules direct the first and second switch controllers, respectively, to change which of the power sources supply the electric current to the rail vehicles over the conductive pathways based on the load demand (e.g., the first switching module directs the first switch controller to change which of the first plurality of power sources supply electric current to the rail vehicles over the first and second conductive pathways based on the load demand, and the second switching module directs the second switch controller to change which of the second plurality of power sources supply electric current to the rail vehicles over the second and third conductive pathways based on the load demand). In one aspect, one or more of the power sources of the first plurality of power sources may be the same as one or more of the power sources of the second plurality of power sources.

One embodiment described herein relates to a control assembly. The control assembly includes a monitoring module and a switching module. The monitoring module determines a load demand of a first rail vehicle traveling along a track, wherein the first rail vehicle is supplied with electric current from a plurality of power sources over a conductive pathway extending along the track. The switching module is communicatively coupled with the monitoring module and is joined with a switch controller disposed between the power sources and the conductive pathway. The switching module directs the switch controller to change which of the power sources supply the electric current to the first rail vehicle over the conductive pathway based on the load demand.

In another aspect, the monitoring module determines the load demand based on at least one of: a traffic density parameter of the first rail vehicle and a plurality of second rail vehicles traveling along the track; an electric load parameter of the first rail vehicle; a power supply parameter representative of electric current that one or more of the plurality of power sources is capable of producing based on an ambient condition; an anticipated future load demand of the first rail vehicle; or a cost parameter of supplying the electric current from one or more of the power sources.

In another aspect, the plurality of power sources includes a chargeable energy store and at least one of a renewable energy power source or a utility power source, the switching module directing the switch controller to migrate supply of the electric current to the first rail vehicle between the energy store and the at least one of the renewable energy power source or the utility power source when the load demand decreases below a threshold.

In another aspect, the plurality of power sources includes a chargeable energy store and at least one of a renewable energy power source or a utility power source, the switching module directing the switch controller to migrate supply of the electric current to the first rail vehicle between the energy store and the at least one of the renewable energy power source or the utility power source when the load demand increases above a threshold.

In another aspect, the switching module directs the switch controller to increase the electric current supplied to the first rail vehicle from a first power source of the plurality of power sources with additional electric current supplied by a second power source of the plurality of sources based on the load demand by permitting the second power source to transmit the additional electric current to the conductive pathway.

In another aspect, the switching module directs the switch controller to increase the electric current supplied by a utility power source with the additional electric current supplied by a chargeable energy store.

In another aspect, the plurality of power sources includes a chargeable energy store and at least one of a renewable energy power source or a utility power source, the switching module charging the energy store by directing the switch controller to permit the at least one of the renewable energy power source or the utility power source to transmit electric current to the energy store along the conductive pathway.

In another aspect, the switching module instructs the switch controller to direct regenerated electric current from the first rail vehicle to a chargeable energy store along the conductive pathway.

In another aspect, the monitoring module controls a speed of the first rail vehicle by varying a voltage supplied to the first rail vehicle along the conductive pathway.

In another aspect, at least one of the power sources includes a chargeable energy store and the switching module directs the electric current to the first rail vehicle from the chargeable energy store along the conductive pathway.

Another embodiment described herein provides a control method. The method includes directing electric current from one or more of a plurality of power sources to a first rail vehicle along a conductive pathway that extends along a track on which the first rail vehicle travels; determining a load demand of the first rail vehicle; and changing which of the plurality of power sources supply the electric current to the first rail vehicle based on the load demand of the first rail vehicle.

In another aspect, the step of determining a load demand of the first rail vehicle comprises monitoring at least one of: a traffic density parameter of the first rail vehicle and a plurality of second rail vehicles traveling along the track; an electric load parameter of the first rail vehicle; a power supply parameter representative of electric current that one or more of the plurality of power sources is capable of producing based on an ambient condition; an anticipated future load demand of the first rail vehicle; or a cost parameter of supplying the electric current from two or more of the plurality of power sources.

In another aspect, the plurality of power sources includes a chargeable energy store and at least one of a utility power source or a renewable energy power source, and wherein the step of changing which of the plurality of power sources supply the electric current to the first rail vehicle includes changing the supply of the electric current between the chargeable energy store and the at least one of the utility power source or the renewable energy power source when the load demand increases above a threshold.

In another aspect, the plurality of power sources includes a chargeable energy store and at least one of a utility power source or a renewable energy power source, and wherein the step of changing which of the plurality of power sources supply the electric current to the first rail vehicle includes changing the supply of the electric current between the chargeable energy store to the at least one of the utility power source or the renewable energy power source when the load demand increases above a threshold.

In another aspect, the step of changing which of the plurality of power sources supply the electric current to the first rail vehicle includes increasing the electric current supplied to the first rail vehicle by the plurality of power sources when the load demand exceeds a threshold.

In another aspect, the plurality of power sources includes a chargeable energy store and at least one of a renewable energy power source or a utility power source, further comprising charging the chargeable energy store by transmitting electric current from at least one of the renewable energy power source or the utility power source to the chargeable energy store along the conductive pathway.

In another aspect, the plurality of power sources includes a chargeable energy store, further comprising charging the chargeable energy store with regenerated electric current created by the first rail vehicle.

In another aspect, the control method also includes controlling a speed of the first rail vehicle by varying a voltage supplied to the first rail vehicle along the conductive pathway.

In another aspect, the plurality of power sources includes a chargeable energy store, and wherein the step of directing electric current from one or more of the plurality of power sources to the first rail vehicle comprises directing the electric current from the chargeable energy store to the rail vehicle along the conductive pathway.

Another embodiment provided herein relates to a computer readable storage medium for a control assembly of an electrified rail system. The computer readable storage medium includes instructions to direct the control assembly to: direct at least one of a plurality of power sources to supply electric current to a first rail vehicle along a conductive pathway that extends along a track on which the first rail vehicle travels; determine a load demand of the first rail vehicle; and change which of the plurality of power sources supplies the electric current to the first rail vehicle based on the load demand of the first rail vehicle.

In another aspect, the instructions direct the control assembly to change supply of the electric current to the first rail vehicle from a first power source of the plurality of power sources to a second power source of the plurality of power sources when the load demand crosses a threshold.

In another aspect, the instructions direct the control assembly to increase the electric current supplied to the first rail vehicle by a first power source of the plurality of power sources with additional electric current supplied by a second power source of the plurality of power sources when the load demand exceeds a threshold.

In another aspect, the plurality of power sources includes a chargeable energy store and at least one of a renewable energy power source or a utility power source, the instructions directing the control assembly to charge the chargeable energy store by directing electric current from the at least one of the renewable energy power source and the utility power source along the conductive pathway.

In another aspect, the plurality of power sources includes a chargeable energy store, the instructions directing the control assembly to direct regenerated electric current created by the first rail vehicle to the chargeable energy store along the conductive pathway.

In another aspect, the instructions direct the control assembly to control a speed of the first rail vehicle by varying a voltage supplied to the first rail vehicle along the conductive pathway.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the subject matter described herein without departing from its scope. While the dimensions and types of materials described herein are intended to define the parameters of the various embodiments of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the described subject matter, including the best mode, and also to enable any person skilled in the art to practice the embodiments of subject matter disclosed herein, including making and using any devices or systems and performing any incorporated methods. The patentable scope of the various embodiments of the subject matter set forth herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A control assembly comprising:
 a monitoring module that determines a load demand of a first rail vehicle traveling along a track, wherein the first rail vehicle is supplied with electric current from a plurality of power sources over a conductive pathway extending along the track; and
 a switching module communicatively coupled with the monitoring module and joined with a switch controller disposed between the power sources and the conductive pathway, the switching module directing the switch controller to change which of the power sources supply the electric current to the first rail vehicle over the conductive pathway based on the load demand.

2. The control assembly of claim 1, wherein the monitoring module determines the load demand based on at least one of: a traffic density parameter of the first rail vehicle and a plurality of second rail vehicles traveling along the track; an electric load parameter of the first rail vehicle; a power supply parameter representative of electric current that one or more of the plurality of power sources is capable of producing based on an ambient condition; an anticipated future load demand of the first rail vehicle; or a cost parameter of supplying the electric current from one or more of the power sources.

3. The control assembly of claim 1, wherein the plurality of power sources includes a chargeable energy store and at least one of a renewable energy power source or a utility power source, the switching module directing the switch controller to migrate supply of the electric current to the first rail vehicle between the energy store and the at least one of the renewable energy power source or the utility power source when the load demand decreases below a threshold.

4. The control assembly of claim 1, wherein the plurality of power sources includes a chargeable energy store and at least one of a renewable energy power source or a utility power source, the switching module directing the switch controller to migrate supply of the electric current to the first rail vehicle between the energy store and the at least one of the renewable energy power source or the utility power source when the load demand increases above a threshold.

5. The control assembly of claim 1, wherein the switching module directs the switch controller to increase the electric current supplied to the first rail vehicle from a first power source of the plurality of power sources with additional electric current supplied by a second power source of the plurality of sources based on the load demand by permitting the second power source to transmit the additional electric current to the conductive pathway.

6. The control assembly of claim 5, wherein the switching module directs the switch controller to increase the electric current supplied by a utility power source with the additional electric current supplied by a chargeable energy store.

7. The control assembly of claim 1, wherein the plurality of power sources includes a chargeable energy store and at least one of a renewable energy power source or a utility power source, the switching module charging the energy store by directing the switch controller to permit the at least one of the renewable energy power source or the utility power source to transmit electric current to the energy store along the conductive pathway.

8. The control assembly of claim 1, wherein the switching module instructs the switch controller to direct regenerated electric current from the first rail vehicle to a chargeable energy store along the conductive pathway.

9. The control assembly of claim 1, wherein the monitoring module controls a speed of the first rail vehicle by varying a voltage supplied to the first rail vehicle along the conductive pathway.

10. The control assembly of claim 1, wherein at least one of the power sources includes a chargeable energy store and the switching module directs the electric current to the first rail vehicle from the chargeable energy store along the conductive pathway.

11. A control method comprising:
directing electric current from one or more of a plurality of power sources to a first rail vehicle along a conductive pathway that extends along a track on which the first rail vehicle travels, the plurality of power sources including a chargeable energy store and at least one of a utility power source or a renewable energy power source;
charging the chargeable energy store by transmitting electric current from at least one of the renewable energy power source or the utility power source to the chargeable energy store along the conductive pathway;
determining a load demand of the first rail vehicle;
monitoring at least one of an amount of the electric current that the renewable energy power source is capable of producing based on ambient conditions or different financial costs of supplying the electric current from two or more of the plurality of power sources; and
changing which of the plurality of power sources supply the electric current to the first rail vehicle based on the load demand of the first rail vehicle and the at least one of the amount of the electric current that the renewable energy power source is capable of producing or the financial costs of supplying the electric current by changing the supply of the electric current between the chargeable energy store and the at least one of the utility power source or the renewable energy power source when the load demand increases above a first threshold.

12. The control method of claim 11, wherein the step of changing which of the plurality of power sources supply the electric current to the first rail vehicle includes increasing the electric current supplied to the first rail vehicle by the plurality of power sources when the load demand exceeds one or more of the first threshold or a different, second threshold.

13. The control method of claim 11, comprising charging the chargeable energy store with regenerated electric current created by the first rail vehicle.

14. The control method of claim 13, further comprising controlling a rate at which the regenerated electric current is supplied to the chargeable energy store such that the rate is reduced when the load parameter decreases and the rate is increased when the load parameter increases.

15. The control method of claim 13, further comprising directing the chargeable energy store to supply the regenerated electric current used to charge the chargeable energy store to the utility power source over an extended time period that is longer than a time period during which the regenerated electric current is created by the first rail vehicle.

16. The control method of claim 11, further comprising controlling a speed of the first rail vehicle by varying a voltage supplied to the first rail vehicle along the conductive pathway.

17. The control method of claim 11, wherein the step of directing electric current from one or more of the plurality of power sources to the first rail vehicle comprises directing the electric current from the chargeable energy store to the rail vehicle along the conductive pathway.

18. The control method of claim 11, wherein the step of determining a load demand of the first rail vehicle comprises monitoring at least one of: a traffic density parameter of the first rail vehicle and a plurality of second rail vehicles traveling along the track; an electric load parameter of the first rail vehicle; or an anticipated future load demand of the first rail vehicle.

19. The control method of claim 11, wherein the renewable energy power source includes at least one of a wind turbine or a solar panel and the ambient conditions represent at least one of a speed at which wind is blowing at the wind turbine or an amount of light on the solar panel.

20. The control method of claim 11, wherein the financial costs of supplying the electric current change with respect to time.

21. A computer readable storage medium for a control assembly of an electrified rail system, the computer readable storage medium comprising instructions to direct the control assembly to:
direct at least one of a plurality of power sources to supply electric current to a first rail vehicle along a conductive pathway that extends along a track on which the first rail vehicle travels, wherein the plurality of power sources includes a chargeable energy store and at least one of a renewable energy power source or a utility power source;
charge the chargeable energy store by directing electric current from the at least one of the renewable energy power source and the utility power source along the conductive pathway;
determine a load demand of the first rail vehicle;
monitor at least one of an amount of the electric current that the renewable energy power source is capable of producing based on ambient conditions or different financial costs of supplying the electric current from two or more of the plurality of power sources; and
change which of the plurality of power sources supplies the electric current to the first rail vehicle based on the load demand of the first rail vehicle and the at least one of the amount of the electric current that the renewable energy power source is capable of producing or the financial costs of supplying the electric current by changing supply of the electric current to the first rail vehicle from a first power source of the plurality of power sources to a second power source of the plurality of power sources when the load demand crosses a threshold.

22. The computer readable storage medium of claim 21, wherein the instructions direct the control assembly to increase the electric current supplied to the first rail vehicle by the first power source of the plurality of power sources with additional electric current supplied by the second power source of the plurality of power sources when the load demand exceeds the threshold.

23. The computer readable storage medium of claim 21, wherein the plurality of power sources includes a chargeable energy store, the instructions directing the control assembly to direct regenerated electric current created by the first rail vehicle to the chargeable energy store along the conductive pathway.

24. The computer readable storage medium of claim 21, wherein the instructions direct the control assembly to control a speed of the first rail vehicle by varying a voltage supplied to the first rail vehicle along the conductive pathway.

25. The computer readable storage medium of claim 21, wherein the computer readable storage medium is a tangible and non-transitory computer readable storage medium.

* * * * *